(12) United States Patent
Bouba et al.

(10) Patent No.: US 11,638,115 B2
(45) Date of Patent: *Apr. 25, 2023

(54) POINTS OF INTEREST IN A LOCATION SHARING SYSTEM

(71) Applicant: Snap Inc., Santa Monica, CA (US)

(72) Inventors: David Bouba, Paris (FR); Eric Guillaume, Sannois (FR); Xabier Jaureguiberry, Vincennes (FR)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,065

(22) Filed: Jun. 11, 2021

(65) Prior Publication Data

US 2021/0377693 A1   Dec. 2, 2021

Related U.S. Application Data

(63) Continuation of application No. 16/864,658, filed on May 1, 2020, now Pat. No. 11,039,270, which is a
(Continued)

(51) Int. Cl.
*H04W 4/029* (2018.01)
*H04W 4/021* (2018.01)
(Continued)

(52) U.S. Cl.
CPC .......... *H04W 4/021* (2013.01); *G06N 20/00* (2019.01); *H04W 4/029* (2018.02); *H04W 4/12* (2013.01);
(Continued)

(58) Field of Classification Search
CPC ....... H04W 4/021; H04W 4/029; H04W 4/12; H04W 4/185; H04W 64/00; H04W 84/12;
(Continued)

(56) References Cited

U.S. PATENT DOCUMENTS

| 5,880,731 A | 3/1999 | Liles et al. |
| 6,023,270 A | 2/2000 | Brush, II et al. |

(Continued)

FOREIGN PATENT DOCUMENTS

| CN | 109863532 | 6/2019 |
| CN | 110168478 | 8/2019 |

(Continued)

OTHER PUBLICATIONS

"U.S. Appl. No. 16/368,320, Non Final Office Action dated Oct. 7, 2019", 14 pgs.

(Continued)

*Primary Examiner* — Julio R Perez
(74) *Attorney, Agent, or Firm* — Schwegman Lundberg & Woessner, P.A.

(57) ABSTRACT

Systems, and methods for predicting that a user is located at a labeled place corresponding to a point of interest. A server computer accesses historical data comprising location data, and wireless network data collected from a plurality of client devices of a plurality of users over a period of time. For one or more labeled places, the data points corresponding to one of the users being located at the labeled place are identified. A labeled dataset is generated by tagging the identified data points with a label corresponding to the corresponding labeled place. A machine learning model is trained on the labeled dataset, so that when current location data are receiving from a client device of a user, it is possible to determine, using the trained machine learning model, whether the user is located at one of the one or more labeled places.

20 Claims, 13 Drawing Sheets

Related U.S. Application Data continuation of application No. 16/368,320, filed on Mar. 28, 2019, now Pat. No. 10,674,311.

(51) Int. Cl.
*H04W 4/18* (2009.01)
*H04W 4/12* (2009.01)
*G06N 20/00* (2019.01)
*H04W 64/00* (2009.01)
*H04W 84/12* (2009.01)

(52) U.S. Cl.
CPC ........... *H04W 4/185* (2013.01); *H04W 64/00* (2013.01); *H04W 84/12* (2013.01)

(58) Field of Classification Search
CPC ........ G06N 20/00; G06N 5/003; G06N 5/022; G06N 20/20
See application file for complete search history.

(56) References Cited

U.S. PATENT DOCUMENTS

| | | | |
|---|---|---|---|
| 6,223,165 B1 | 4/2001 | Lauffer | |
| 6,772,195 B1 | 8/2004 | Hatlelid et al. | |
| 6,842,779 B1 | 1/2005 | Nishizawa | |
| 7,342,587 B2 | 3/2008 | Danzig et al. | |
| 7,468,729 B1 | 12/2008 | Levinson | |
| 7,636,755 B2 | 12/2009 | Blattner et al. | |
| 7,639,251 B2 | 12/2009 | Gu et al. | |
| 7,775,885 B2 | 8/2010 | Van et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,362,219 B2 | 7/2019 | Wilson et al. | |
| 10,475,225 B2 | 11/2019 | Park et al. | |
| 10,504,266 B2 | 12/2019 | Blattner et al. | |
| 10,573,048 B2 | 2/2020 | Ni et al. | |
| 10,657,701 B2 | 5/2020 | Osman et al. | |
| 10,674,311 B1 | 6/2020 | Bouba et al. | |
| 11,039,270 B2 * | 6/2021 | Bouba | H04W 4/12 |
| 2002/0067362 A1 | 6/2002 | Agostino Nocera et al. | |
| 2002/0169644 A1 | 11/2002 | Greene | |
| 2005/0162419 A1 | 7/2005 | Kim et al. | |
| 2005/0206610 A1 | 9/2005 | Cordelli | |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0158222 A1 | 7/2008 | Li et al. | |
| 2009/0016617 A1 | 1/2009 | Bregman-amitai et al. | |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2010/0305855 A1 * | 12/2010 | Dutton | H04L 67/04 340/8.1 |
| 2011/0093780 A1 | 4/2011 | Dunn | |
| 2011/0115798 A1 | 5/2011 | Nayar et al. | |
| 2011/0148864 A1 | 6/2011 | Lee et al. | |
| 2011/0239136 A1 | 9/2011 | Goldman et al. | |

(56) References Cited

U.S. PATENT DOCUMENTS

| | | |
|---|---|---|
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0143963 A1 | 6/2012 | Kennberg et al. |
| 2012/0226554 A1 | 9/2012 | Schmidt et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0337830 A1* | 12/2013 | Haro ............... H04W 4/021 |
| | | 455/456.1 |
| 2014/0040371 A1* | 2/2014 | Gurevich ......... H04W 4/029 |
| | | 709/204 |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0181193 A1* | 6/2014 | Narasimhan ........ G06Q 50/01 |
| | | 709/204 |
| 2015/0206349 A1 | 7/2015 | Rosenthal et al. |
| 2016/0055250 A1 | 2/2016 | Rush |
| 2016/0134840 A1 | 5/2016 | Mcculloch |
| 2016/0234149 A1 | 8/2016 | Tsuda et al. |
| 2017/0076198 A1* | 3/2017 | Jin ...................... G06N 3/08 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0316571 A1 | 11/2018 | Andrade et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2020/0314586 A1 | 10/2020 | Bouba et al. |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |

OTHER PUBLICATIONS

"U.S. Appl. No. 16/368,320, Notice of Allowance dated Jan. 24, 2020", 7 pgs.

"U.S. Appl. No. 16/368,320, Response filed Jan. 7, 2020 to Non Final Office Action dated Oct. 7, 2019", 9 pgs.

"U.S. Appl. No. 16/864,658, Preliminary Amendment filed May 4, 2020", 7 pgs.

"U.S. Appl. No. 16/864,658, Non Final Office Action dated Jun. 1, 2020", 17 pgs.

"U.S. Appl. No. 16/864,658, Response filed Sep. 1, 2020 to Non Final Office Action dated Jun. 1, 2020", 9 pgs.

"U.S. Appl. No. 16/864,658, Notice of Allowance dated Oct. 20, 2020", 8 pgs.

"U.S. Appl. No. 16/864,658, Notice of Allowance dated Feb. 18, 2021", 10 pgs.

U.S. Appl. No. 16/368,320, U.S. Pat. No. 10,674,311, filed Mar. 28, 2019, Points of Interest in a Location Sharing System.

U.S. Appl. No. 16/864,658, U.S. Pat. No. 11,039,270, filed May 1, 2020, Points of Interest in a Location Sharing System.

* cited by examiner

POINTS OF INTEREST IN A LOCATION SHARING SYSTEM

CLAIM OF PRIORITY

This application is a continuation of U.S. patent application Ser. No. 16/864,658, filed on May 1, 2020, which application is a continuation of U.S. patent application Ser. No. 16/368,320, filed on Mar. 28, 2019, now issued as U.S. Pat. No. 10,674,311, both of which are incorporated herein by reference in their entirety.

BACKGROUND

The popularity of electronic messaging, particularly instant messaging, continues to grow. Users increasingly share media content items such as electronic images and videos with each other, reflecting a global demand to communicate more visually. Similarly, users increasingly seek to customize the media content items they share with others, providing challenges to social networking systems seeking to generate custom media content for their members. Embodiments of the present disclosure address these and other issues.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
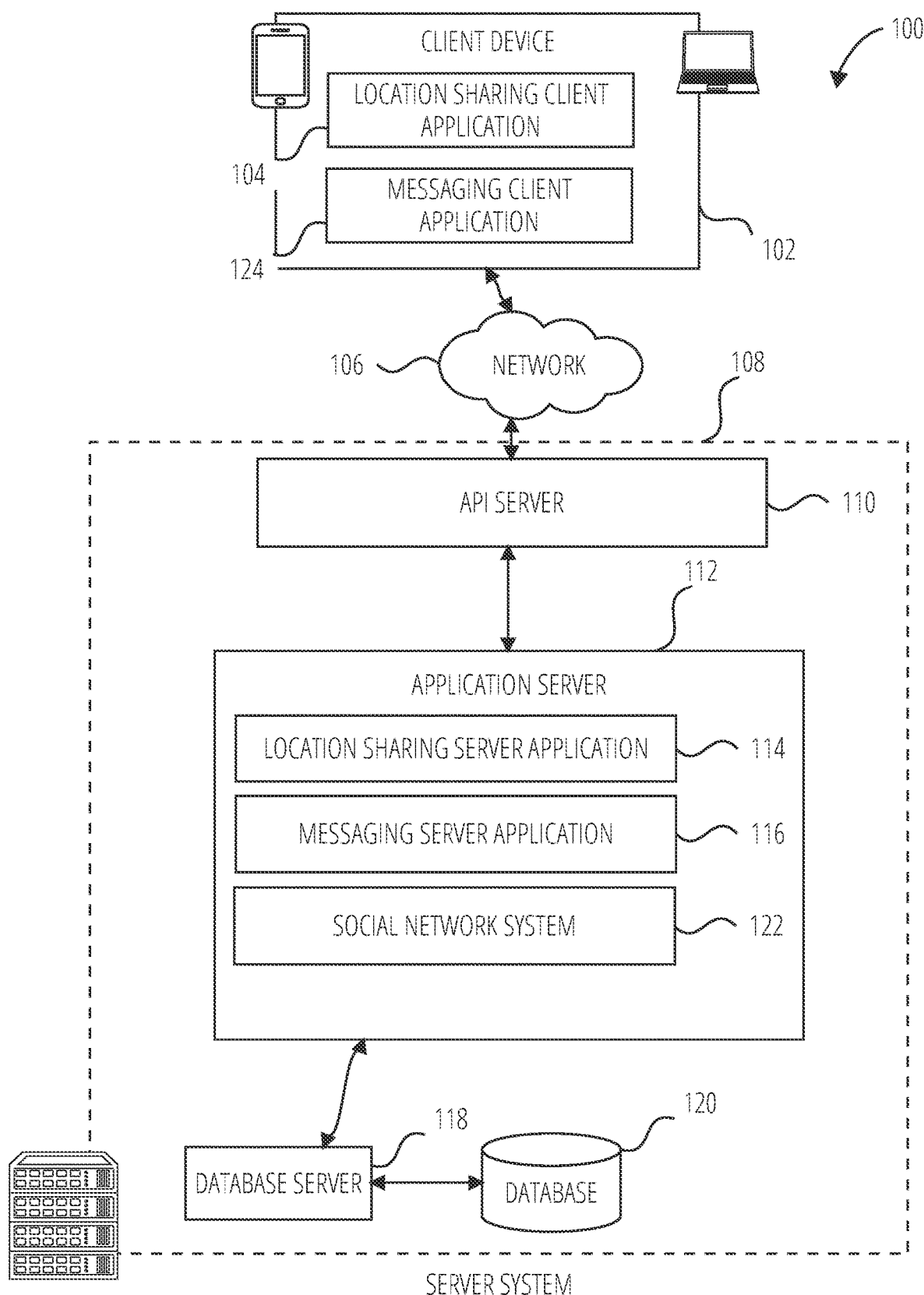
FIG. 1 is a diagrammatic representation of a networked environment in which the present disclosure may be deployed, in accordance with some example embodiments.

Embodiments of the present disclosure provide a geographically-based graphical user interface (GUI). This user interface may be referred to herein as a "map GUI," and may be used in conjunction with a social media application. In some embodiments, the map GUI may include representations of at least approximate respective positions of a user and a user's friends in a social graph accessed by the social media application using avatars for each respective user.

Various embodiments of the present disclosure provide systems, methods, techniques, instruction sequences, and computing machine program products for predicting that a user is or will be located at a labeled place. A labeled place may be any point of interest (e.g., cafe, restaurant, bar, airport, shop, etc.)

Location data are generally not accurate enough to reliably determine whether at user is located at a labeled place. For example, when a user is in a restaurant located in a multi-story building, it is almost impossible to determine whether the user is actually in the restaurant or in an apartment located in the building.

Some embodiments of the present disclosure provide improvements over conventional methods for accurately predicting that a user is located at a labeled place or will be located at a labeled place in the near future. For example, in some embodiments a server computer accesses historical data collected from a plurality of client devices of a plurality of users over a period of time. The historical data comprise a plurality of data points, each data point comprising location data, and wireless network data. For one or more labeled places, the data points corresponding to one of the users being located at the labeled place are identified. A labeled dataset is generated by tagging the identified data points with a label corresponding to the corresponding labeled place. A machine learning model is trained on the labeled dataset, so that when current location data are receiving from a client device of a user, it is possible to determine, using the trained machine learning model, whether the user is located at one of the one or more labeled places.

In some embodiments, the labeled place where the user is located is shared with the user's approved contact or friend accounts via the map GUI. In various embodiments, such data sharing is turned off by default, and the data is only shared if selected for sharing by a privacy setting update provided by the user.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

FIG. 1 is a block diagram showing an example location sharing system 100 for exchanging location data over a network. The location sharing system 100 includes multiple instances of a client device 102, each of which hosts a number of applications including a location sharing client application 104. Each location sharing client application 104 is communicatively coupled to other instances of the location sharing client application 104 and a location sharing server system 108 via a network 106 (e.g., the Internet).

A location sharing client application 104 is able to communicate and exchange data with another location sharing client application 104 and with the location sharing server system 108 via the network 106. The data exchanged between location sharing client application 104, and between a location sharing client application 104 and the location sharing server system 108, includes functions (e.g., commands to invoke functions) as well as payload data (e.g., location data, text, audio, video or other multimedia data).

The location sharing server system 108 provides server-side functionality via the network 106 to a particular location sharing client application 104. While certain functions of the location sharing system 100 are described herein as being performed by either a location sharing client application 104 or by the location sharing server system 108, the location of certain functionality either within the location sharing client application 104 or the location sharing server system 108 is a design choice. For example, it may be technically preferable to initially deploy certain technology and functionality within the location sharing server system 108, but to later migrate this technology and functionality to the location sharing client application 104 where a client device 102 has a sufficient processing capacity.

The location sharing server system 108 supports various services and operations that are provided to the location sharing client application 104. Such operations include transmitting data to, receiving data from, and processing data generated by the location sharing client application 104. This data may include, geolocation information, message content, client device information, media annotation and overlays, message content persistence conditions, social network information, and live event information, as examples. Data exchanges within the location sharing system 100 are invoked and controlled through functions available via user interfaces (UIs) of the location sharing client application 104.

Turning now specifically to the location sharing server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the location sharing client application 104 in order to invoke functionality of the application server 112. The Application Program Interface (API) server 110 exposes various functions supported by the application server 112, including account registration, login functionality, the sending of messages, via the application server 112, from a particular location sharing client application 104 to another location sharing client application 104, the sending of media files (e.g., images or video) from a location sharing client application 104 to the location sharing server application 114, and for possible access by another location sharing client application 104, the setting of a collection of media data (e.g., story), the retrieval of a list of friends of a user of a client device 102, the retrieval of such collections, the retrieval of messages and content, the adding and deletion of friends to a social graph (e.g., entity graph 304), the location of friends within a social graph, and opening an application event (e.g., relating to the location sharing client application 104).

The application server 112 hosts a number of applications and subsystems, including a location sharing server application 114, a messaging server application 116 and a social network system 122.

Examples of functions and services supported by the location sharing server application 114 include generating a map GUI. In some embodiments, the map GUI may include representations of at least approximate respective positions of a user and a user's friends in a social network graph accessed by the social media application using avatars for each respective user.

The location sharing server application 114 may receive user authorization to use, or refrain from using, the user's location information. In some embodiments, the location sharing server application 114 may likewise opt to share or not share the user's location with others via the map GUI. In some cases, the user's avatar may be displayed to the user on the display screen of the user's computing device regardless of whether the user is sharing his or her location with other users.

In some embodiments, a user can select groups of other users to which his/her location will be displayed, and may in specify different display attributes for the different respective groups or for different respective individuals. In one example, audience options include: "Best Friends," "Friends," and "Custom" (which is an individual-level whitelist of people). In this example, if "Friends" are selected, all new people added to the user's friends list will automatically be able to see their location. If they are already sharing with the user, their avatars will appear on the user's map.

In some embodiments, when viewing the map GUI, the user is able to see the location of all his/her friends that have shared their location with the user on the map, each friend represented by their respective avatar. In some embodiments, if the friend does not have an avatar, the friend may be represented using a profile picture or a default icon displayed at the corresponding location for the friend.

In some embodiments, the user can select between friends on the map via a menu, such as a carousel. In some embodiments, selecting a particular friend automatically centers the map view on the avatar of that friend. Embodiments of the present disclosure may also allow the user to take a variety of actions with the user's friends from within the map GUI. For example, the system may allow the user to chat with the user's friends without leaving the map. In one particular example, the user may select a chat icon from a menu presented in conjunction with the map GUI to initiate a chat session.

The messaging server application 116 implements a number of message processing technologies and functions, particularly related to the aggregation and other processing of content (e.g., textual and multimedia content) included in messages received from multiple instances of the location sharing client application 104. As will be described in further detail, the text and media content from multiple sources may be aggregated into collections of content (e.g., called stories or galleries). These collections are then made available, by the location sharing server application 114, to the location sharing client application 104. Other processor and memory intensive processing of data may also be performed server-side by the location sharing server application 114, in view of the hardware requirements for such processing.

The application server 112 is communicatively coupled to a database server 118, which facilitates access to a database 120 in which is stored data processed by the location sharing server application 114.

Figure 3:
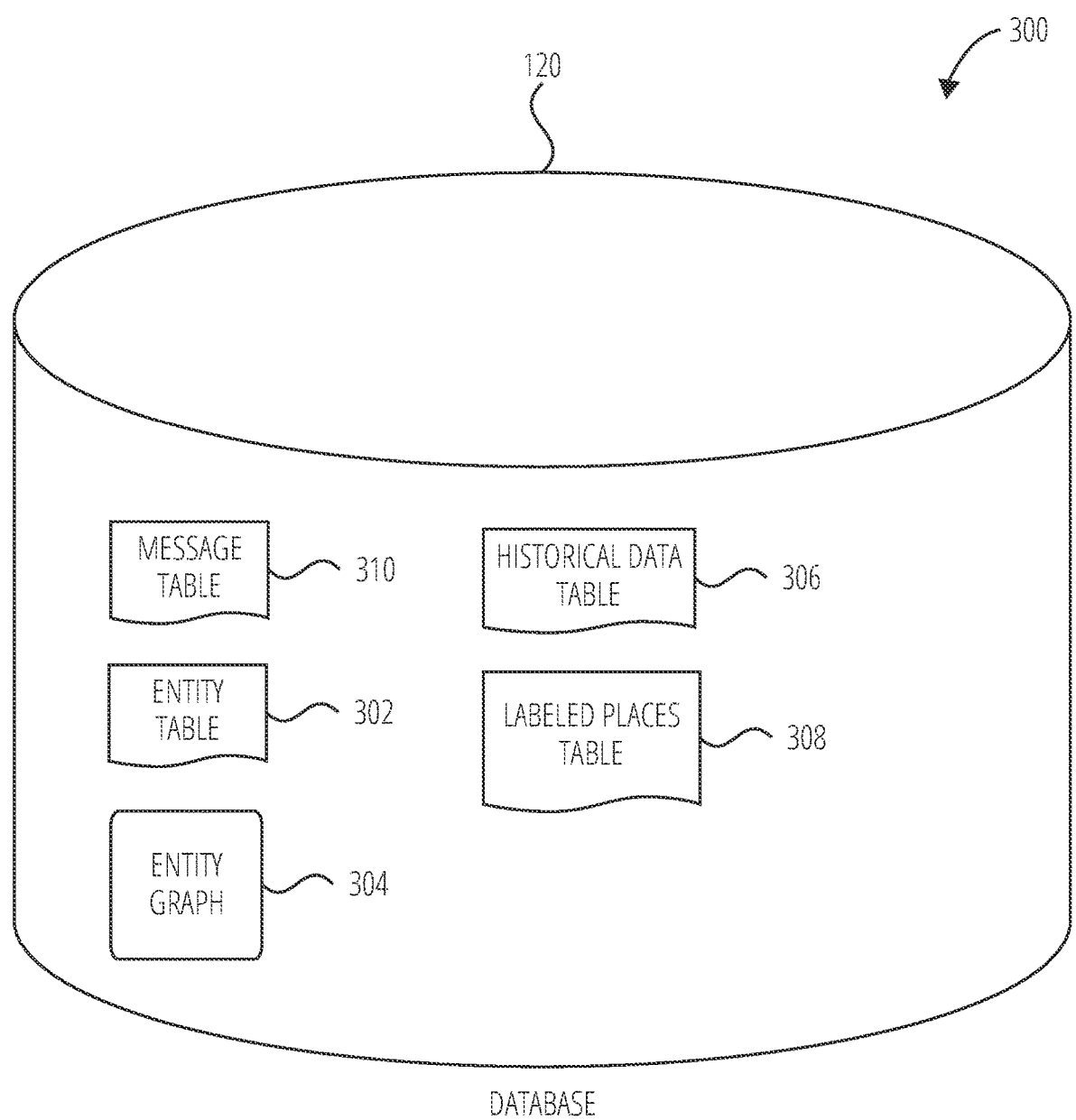
FIG. 3 is a diagrammatic representation of a data structure as maintained in a database, in accordance with some example embodiments.

The social network system 122 supports various social networking functions services, and makes these functions and services available to the location sharing server application 114. To this end, the social network system 122 maintains and accesses an entity graph 304 (as shown in FIG. 3) within the database 120. Examples of functions and services supported by the social network system 122 include the identification of other users of the location sharing system 100 with which a particular user has relationships or is "following", and also the identification of other entities and interests of a particular user.

Figure 2:
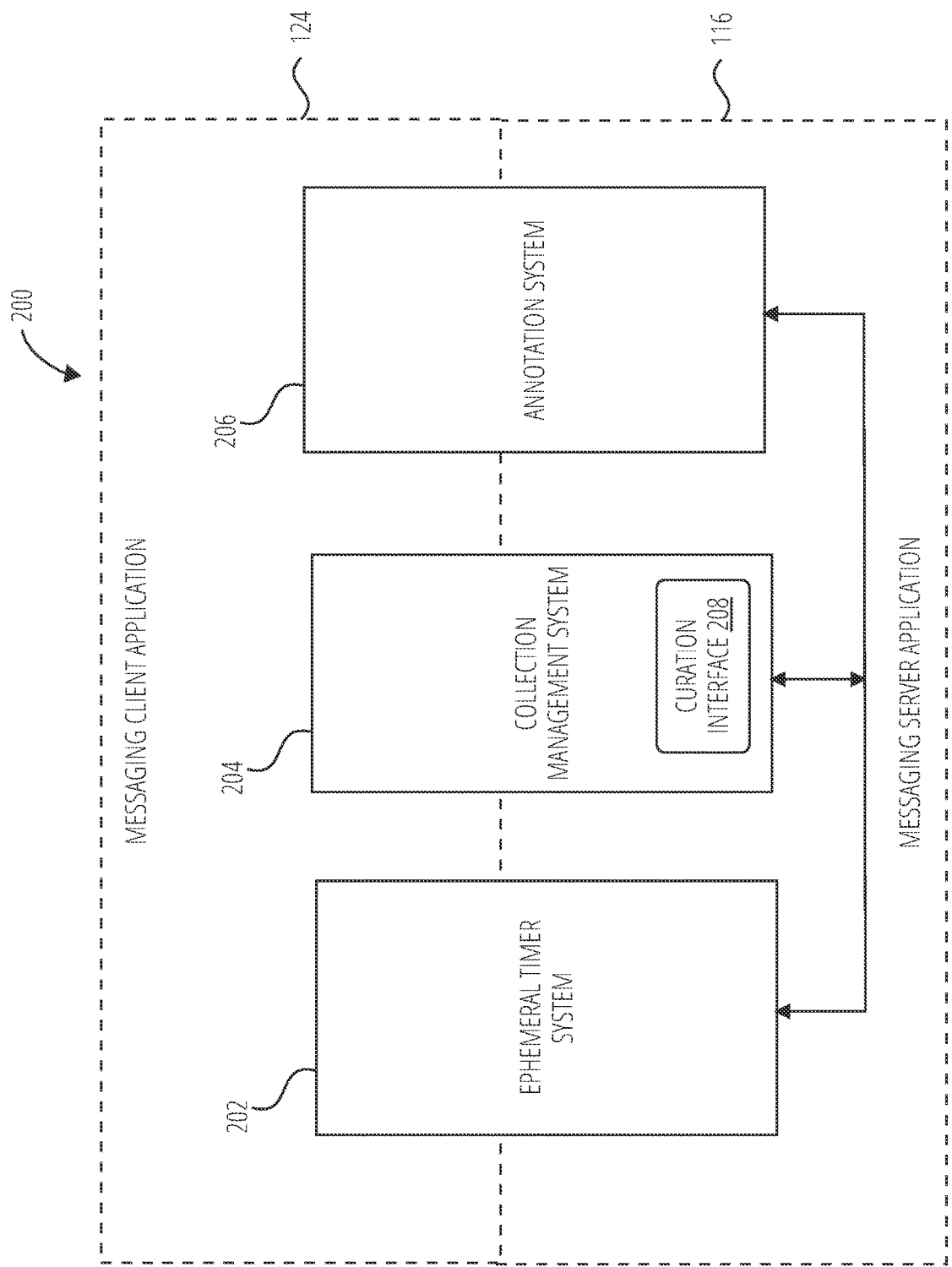
FIG. 2 illustrates a messaging system in accordance with one embodiment.

FIG. 2 is block diagram illustrating further details regarding the messaging system 200, according to example embodiments. Specifically, the messaging system 200 includes the messaging server application 116 and the messaging client application 124, which in turn embody a number of subsystems, namely an ephemeral timer system 202, a collection management system 204, and an annotation system 206.

The ephemeral timer system 202 is responsible for enforcing the temporary access to content permitted by the messaging client application 124 and the location sharing server application 114. To this end, the ephemeral timer system 202 incorporates a number of timers that, based on duration and display parameters associated with a message, or collection of messages (e.g., a story), selectively display and enable access to messages and associated content via the messaging client application 124. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 124.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the location sharing system 100. The annotation system 206 operatively supplies a media overlay or supplementation (e.g., an image filter) to the messaging client application 124 based on a geolocation of the client device 102. In another example, the annotation system 206 operatively supplies a media overlay to the messaging client application 124 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the location sharing server system 108, according to certain example embodiments. While the content of the database 120 is shown to comprise a number of tables, it will be appreciated that the data could be stored in other types of data structures (e.g., as an object-oriented database).

The database 120 includes message data stored within a message table 310. An entity table 302 stores entity data, including an entity graph 304. Entities for which records are maintained within the entity table 302 may include individuals (e.g., users), corporate entities, organizations, objects, places, events, etc. Regardless of type, any entity regarding which the location sharing server system 108 stores data may be a recognized entity. Each entity is provided with a unique identifier, as well as an entity type identifier (not shown). The entity graph 304 furthermore stores information regarding relationships and associations between entities. Such relationships may be social (e.g., friendship), professional (e.g., work at a common corporation or organization) interested-based or activity-based, merely for example. A historical data table 306 stores historical data collected by a plurality of client devices of a period of time (e.g., a year, two years, three months, etc.) The historical data comprise historical location data collected by the client devices (e.g., geolocation information determined by a GPS unit of client device) and historical wireless network data (e.g., wireless local area network (WLAN) information of one or more WLAN networks detected by the client device) collected by the plurality of client devices. A labeled places table 308 stores data of a plurality of labeled places corresponding to points of interest (e.g., bar, restaurant, café, movie theater, airport, hotel, etc.) A point of interest is a specific point location that someone may find useful or interesting, such as a bar, restaurant, cafe, movie theater, airport, hotel, campsite, fuel station. Each labeled place is identified by at least a location (e.g., geographical coordinates), and a name, and may be associated with other information such as a category (e.g., bar, restaurant, cafe, movie theater, airport, hotel, campsite, fuel station, etc.), a popularity, opening hours, and an attendance histogram.

Figure 4:
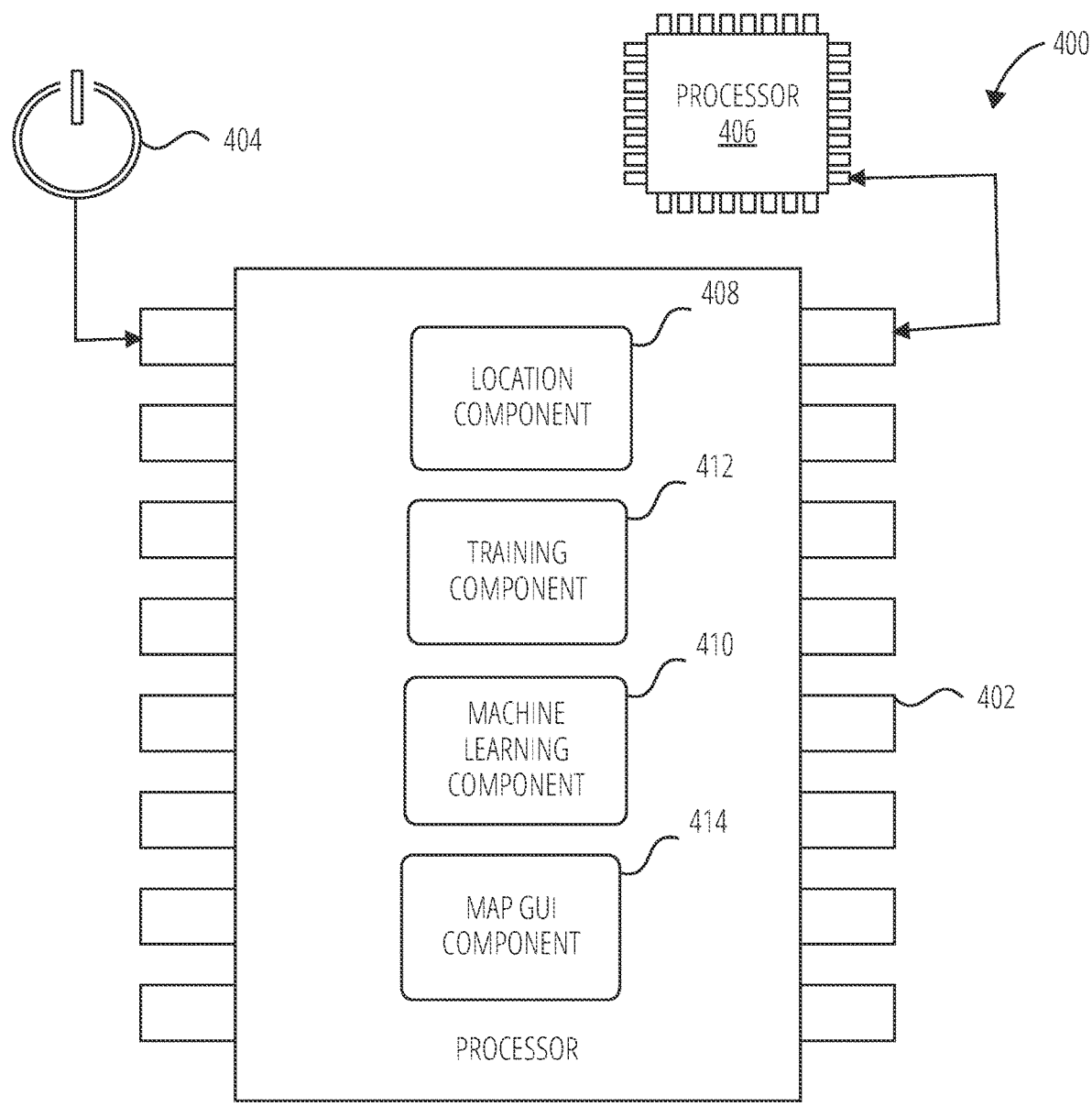
FIG. 4 is a diagrammatic representation of a processing environment, in accordance with some example embodiments.

Turning now to FIG. 4, there is shown a diagrammatic representation of a processing environment 400, which includes at least a processor 402 (e.g., a GPU, CPU or combination thereof).

The processor 402 is shown to be coupled to a power source 404, and to include a plurality of modules. These modules may either be permanently configured or temporarily instantiated. Examples of such modules are illustrated as a location component 408, a training component 412, a machine learning component 410, and a map GUI component 414. The location component 408 generates historical location data of a user by consolidating location data collected over time from one or more client device (e.g., client device 102) associated with the user. The training component 412 accesses the historical data, generates a labeled dataset by tagging the data points of the historical data corresponding to one or more of the users being located at one of the labeled places, and trains the machine learning model on the labeled dataset. The machine learning component 410 implements the trained machine learning model to predict whether a user is located at one of the labeled places. The map GUI component 414 operationally generates user interfaces and causes the user interfaces to be displayed on client devices.

Figure 5:
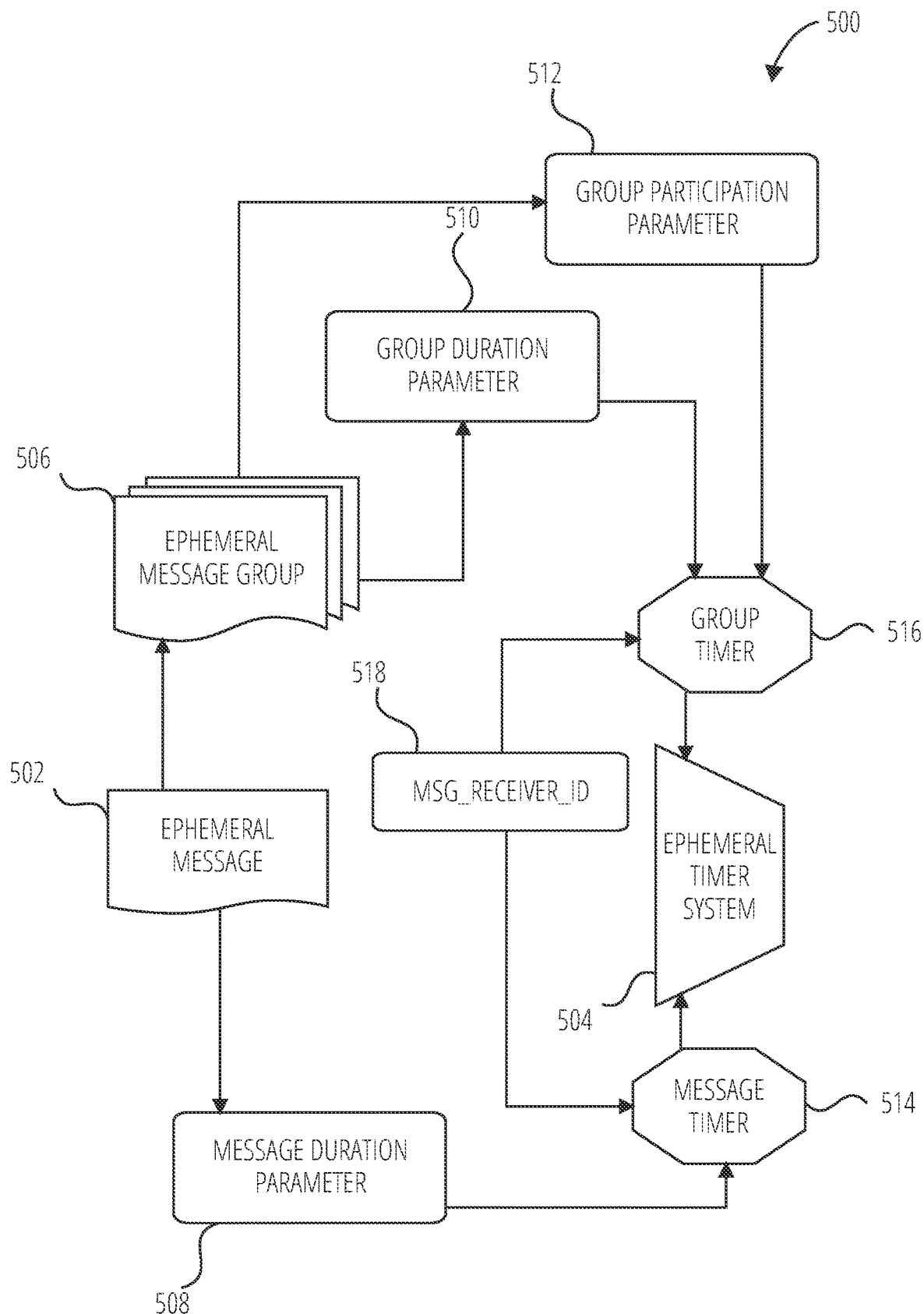
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 506) may be time-limited (e.g., made ephemeral via association with a deletion trigger or other methods to remove content from a system).

An ephemeral message 502 is shown to be associated with a message duration parameter 508, the value of which determines an amount of time that the ephemeral message 502 will be displayed to a receiving user of the ephemeral message 502 by the location sharing client application 104. In one embodiment, an ephemeral message 502 is viewable by a receiving user for up to a maximum of 10 seconds, depending on the amount of time that the sending user specifies using the message duration parameter 508.

The message duration parameter 508 and the message receiver identifier 518 are shown to be inputs to a message timer 514, which is responsible for determining the amount of time that the ephemeral message 502 is shown to a particular receiving user identified by the message receiver identifier 518. In particular, the ephemeral message 502 will only be shown to the relevant receiving user for a time period determined by the value of the message duration parameter 508. The message timer 514 is shown to provide output to a more generalized ephemeral timer system 504, which is responsible for the overall timing of display of content (e.g., an ephemeral message 502) to a receiving user.

The ephemeral message 502 is shown in FIG. 5 to be included within an ephemeral message group 506 (e.g., a collection of messages in a personal story, or an event story). The ephemeral message group 506 has an associated group duration parameter 510, a value of which determines a time-duration for which the ephemeral message group 506 is presented and accessible to users of the location sharing system 100. The group duration parameter 510, for example, may be the duration of a music concert, where the ephemeral message group 506 is a collection of content pertaining to that concert. Alternatively, a user (either the owning user or a curator user) may specify the value for the group duration parameter 510 when performing the setup and creation of the ephemeral message group 506.

Additionally, each ephemeral message 502 within the ephemeral message group 506 has an associated group participation parameter 512, a value of which determines the duration of time for which the ephemeral message 502 will be accessible within the context of the ephemeral message group 506. Accordingly, a particular ephemeral message group 506 may "expire" and become inaccessible within the context of the ephemeral message group 506, prior to the ephemeral message group 506 itself expiring in terms of the group duration parameter 510. The group duration parameter 510, group participation parameter 512, and message receiver identifier 518 each provide input to a group timer 516, which operationally determines, firstly, whether a particular ephemeral message 502 of the ephemeral message group 506 will be displayed to a particular receiving user and, if so, for how long. Note that the ephemeral message group 506 is also aware of the identity of the particular receiving user as a result of the message receiver identifier 518.

Accordingly, the group timer 516 operationally controls the overall lifespan of an associated ephemeral message group 506, as well as an individual ephemeral message 502 included in the ephemeral message group 506. In one embodiment, each and every ephemeral message 502 within the ephemeral message group 506 remains viewable and accessible for a time-period specified by the group duration parameter 510. In a further embodiment, a certain ephemeral message 502 may expire, within the context of ephemeral message group 506, based on a group participation parameter 512. Note that a message duration parameter 508 may still determine the duration of time for which a particular ephemeral message 502 is displayed to a receiving user, even within the context of the ephemeral message group 506. Accordingly, the message duration parameter 508 determines the duration of time that a particular ephemeral message 502 is displayed to a receiving user, regardless of whether the receiving user is viewing that ephemeral message 502 inside or outside the context of an ephemeral message group 506.

The ephemeral timer system 504 may furthermore operationally remove a particular ephemeral message 502 from the ephemeral message group 506 based on a determination that it has exceeded an associated group participation parameter 512. For example, when a sending user has established a group participation parameter 512 of 24 hours from posting, the ephemeral timer system 504 will remove the relevant ephemeral message 502 from the ephemeral message group 506 after the specified 24 hours. The ephemeral timer system 504 also operates to remove an ephemeral message group 506 either when the group participation parameter 512 for each and every ephemeral message 502 within the ephemeral message group 506 has expired, or when the ephemeral message group 506 itself has expired in terms of the group duration parameter 510.

In certain use cases, a creator of a particular ephemeral message group 506 may specify an indefinite group duration parameter 510. In this case, the expiration of the group participation parameter 512 for the last remaining ephemeral message 502 within the ephemeral message group 506 will determine when the ephemeral message group 506 itself expires. In this case, a new ephemeral message 502, added to the ephemeral message group 506, with a new group participation parameter 512, effectively extends the life of an ephemeral message group 506 to equal the value of the group participation parameter 512.

Responsive to the ephemeral timer system 504 determining that an ephemeral message group 506 has expired (e.g., is no longer accessible), the ephemeral timer system 504 communicates with the location sharing system 100 (and, for example, specifically the location sharing client application 104) to cause an indicium (e.g., an icon) associated with the relevant ephemeral message group 506 to no longer be displayed within a user interface of the location sharing client application 104. Similarly, when the ephemeral timer system 202 determines that the message duration parameter 508 for a particular ephemeral message 502 has expired, the ephemeral timer system 504 causes the location sharing client application 104 to no longer display an indicium (e.g., an icon or textual identification) associated with the ephemeral message 502.

Figure 6:
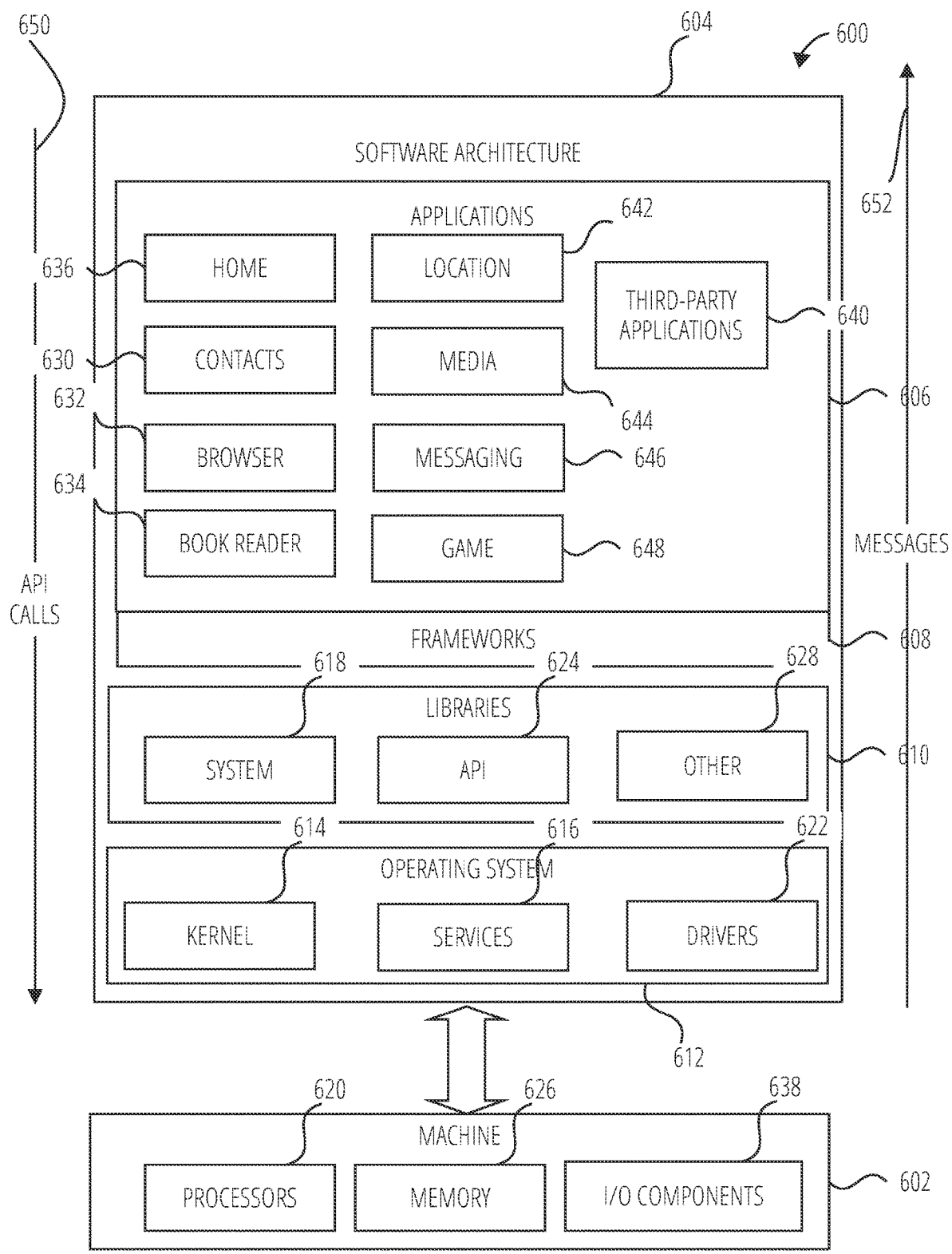
FIG. 6 is block diagram showing a software architecture within which the present disclosure may be implemented, in accordance with some example embodiments.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as third-party applications 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party applications 640 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 640 can invoke the API calls 650 provided by the operating system 612 to facilitate functionality described herein.

Figure 7:
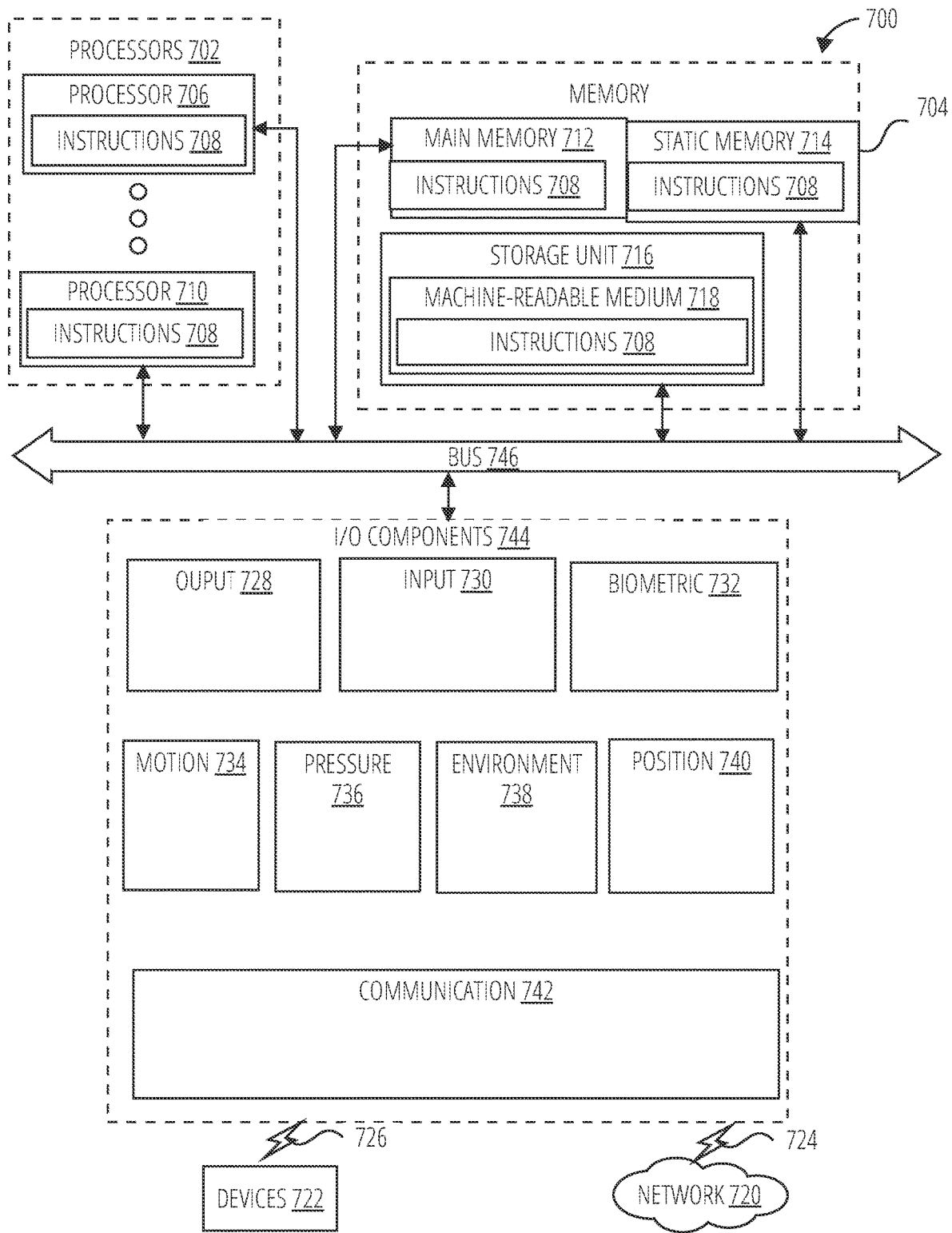
FIG. 7 is a diagrammatic representation of a machine, in the form of a computer system within which a set of instructions may be executed for causing the machine to perform any one or more of the methodologies discussed, in accordance with some example embodiments.

FIG. 7 is a diagrammatic representation of a machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 744, which may be configured to communicate with each other via a bus 746. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 746. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 744 may include a wide variety of components to receive input, provide output, produce output, transmit information, exchange information, capture measurements, and so on. The specific I/O components 744 that are included in a particular machine will depend on the type of machine. For example, portable machines such as mobile phones may include a touch input device or other such input mechanisms, while a headless server machine will likely not include such a touch input device. It will be appreciated that the I/O components 744 may include many other components that are not shown in FIG. 7. In various example embodiments, the I/O components 744 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 744 may further include biometric components 732, motion components 734, environmental components 738, or position components 740, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 738 include, for example, illumination sensor components (e.g., photometer), temperature sensor components (e.g., one or more thermometers that detect ambient temperature), humidity sensor components, acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 740 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 744 further include communication components 742 operable to couple the machine 700 to a network 720 or devices 722 via a coupling 724 and a coupling 726, respectively. For example, the communication components 742 may include a network interface component or another suitable device to interface with the network 720. In further examples, the communication components 742 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 742 may detect identifiers or include components operable to detect identifiers. For example, the communication components 742 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 742, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 742) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

Figure 8:
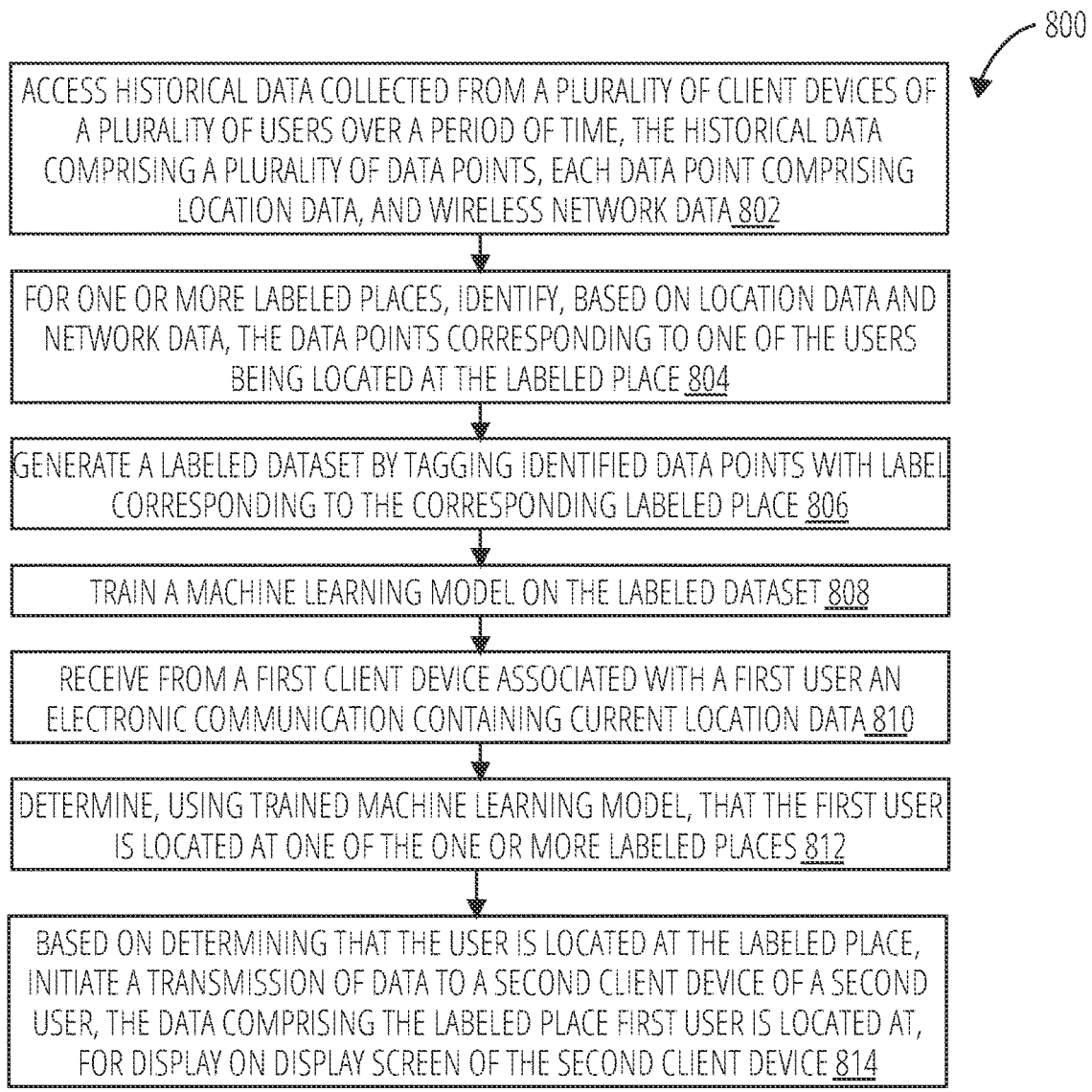
FIG. 8 illustrates a method in accordance with one embodiment.

FIG. 8 is a flowchart illustrating a method 800 for predicting that a user is located at a labeled place. The method 800 may be embodied in computer-readable instructions for execution by one or more processors (e.g., processor 402) such that the steps of the method 800 may be performed in part or in whole by functional components (e.g., location component 408, machine learning component 410, training component 412, map GUI component 414) of a processing environment 400 of a system (e.g., application server 112); accordingly, the method 800 is described below by way of example with reference thereto. However, it shall be appreciated that the method 800 may be deployed on various other hardware configurations and is not intended to be limited to the functional components of the processing environment 400.

In block 802, method 800 accesses, from a database (e.g., database 120) coupled to a server computer (e.g., application server 112), historical data collected from a plurality of client devices of a plurality of users over a period of time (e.g., a year).

The historical data includes a plurality of data points, each point being defined by at least location data (e.g., a set of geographical coordinates), wireless network data (e.g., WLAN information of one or more WLAN networks detected by the client device), and a time stamp. The historical data of a user may be generated by consolidating data collected over a period of time from one or more client devices (e.g., client device 102) associated with the user. A data point may be generated by aggregating historical data (e.g., location data, and wireless network data) collected by a client device while the client device stayed within a maximum range for a minimum amount of time.

The location data may be generated by one or more location sensors (e.g., position components 740) coupled to the client device. In some embodiments, the location sensors may include a global positioning sensor (GPS) component integrated in the client device, as well as other types of location sensors.

The wireless network data may include parameters of a one or more WLANs detected by the client device. In particular, the wireless network data may include a network name (e.g., SSID (service set identifier)) of the one or more WLANs. The network name may be a natural language label. The network data may be collected by one or more wireless enabled client devices (e.g., client device 102). Wireless client devices may be any sort of client device (e.g., smartphones, laptops, personal digital assistants, IP phones). The wireless network data may be generated by the wireless network interface of the client device (e.g., a wireless network interface controllers (WNIC)). The network data may alternatively or additionally be collected by access points (APs) (e.g., wireless router) of the wireless network that transmit and receive radio frequencies with the client devices.

The historical data may further comprise venue metadata (e.g., popularity, opening hours, attendance histogram) of the one or more labeled places. Venue metadata may be retrieved from a database or from a third-party server.

The historical data may further comprise checking in data provided by one or more of the plurality of users at the one or more labeled place. For example, when a user is located at a labeled place, he/she may notify the location sharing server application (e.g., via the location sharing client application). When the location sharing server application determines, based on current location data received from a client device of a user, that the user might be at a labeled place, the location sharing server application might prompt the user (e.g., via the location sharing client application) to verify whether he/she is located at the labeled place (e.g., via a popup displayed on the user's client device).

The system may need to receive authorization from the user to collect and utilize data from the user's client devices prior to performing method 800. Such authorization may be obtained via acceptance of a terms of service for utilizing an online social network or other service provided by the system, by acceptance on a case-by-case basis by the first user (e.g., via popups displayed on the user's computing device) or using any other suitable method for obtaining authorization by the user(s).

In block 804, method 800 identifies the data points, among the plurality of data points, corresponding to one of the users being located at one of the labeled place. The system may determine that the user was located at a labeled place at a particular data point, based on the location of the user at the particular data point being within a geographical scope of the labeled place. In addition, as explained in more details in relation to FIG. 9, the system may determine that the user was located at a labeled place at a particular data point, based on a name of one of the WLAN networks detected by the client device of the user matching the name of the labeled place. In addition, the system may determine that the user was located at a labeled place, based on detecting that the user was spending time with another user, when it is determined that the other user was at the labeled place. In addition, the system may determine that the user is located at a labeled place, based on checking in data indicating that the user was at the labeled place.

In block 806, method 800 generates a labeled dataset by tagging each of the identified data points with a label corresponding to the labeled place where the user was located. The training component 412 takes the set of historical data and augments each data points identified as corresponding to one of the users being located at one of the labeled place with a tag corresponding to the labeled place.

In block 808, method 800 trains a machine learning model on the labeled dataset and on a learning problem formulated as predicting whether the user is located at one of the labeled places. The machine learning model is trained on the labeled data so that, when a new data point is presented to the machine learning model, the machine learning model can predict a likely labeled place for the new data point, together with a probability of the user being at the labeled place. In embodiments, the machine learning model is trained on predicting a labeled place where the user is likely to be located at the timestamp of the new data point. In embodiments, the machine learning model is trained on predicting a labeled place where the user is likely to be located at a timestamp subsequent to the timestamp of the new data point.

In embodiment, the machine model is built in a stage-wise fashion and generalized by allowing optimization of an arbitrary differentiable loss function. The machine learning model may user machine learning techniques for regression and classification problems, which produce a prediction model in the form of an ensemble of weak prediction models, such as decision trees. In particular, the machine learning model may use a gradient boosting (e.g., XGBoost).

In block 810, method 800 receives, at the server computer (e.g., application server 112), from a first client device, the first client device being associated with a first user, an electronic communication containing current location data. The current location data of the user may include location data gathered by one or more of the client devices (e.g., client device 102) of the user over a recent period of time (e.g., 1 min). The system may receive location data on a periodic basis or on an irregular basis and may request data from the client device or receive such data from the client device without such a request. In some embodiments, the client device contains software that monitors the location from the client device and transmits updates to the system in response to detecting new location. For example, the client device may update the system with a new location only after the location changes by at least a predetermined distance to allow a user to move about a building or other location without triggering updates.

The system may need to receive authorization from the first user to utilize data from the first user's client devices prior to performing the remaining steps of method 800. Such authorization may be obtained via acceptance of a terms of service for utilizing an online social network or other service provided by the system, by acceptance on a case-by-case basis by the first user (e.g., via popups displayed on the user's computing device) or using any other suitable method for obtaining authorization by the user(s).

In block 812, method 800 determines, using the trained machine learning model, that the first user is located at one of the one or more labeled places. A new data point is extracted from the current location data. The new data point is defined by at least location data (e.g., a set of geographical coordinates), and a time stamp. The new data point may be extracted by consolidating the current data received from one or more client devices (e.g., client device 102) associated with the user over a period of time during which the user stayed within a maximum range for a minimum amount of time.

In embodiments, the system determines, using the trained machine learning model, whether the first user is currently located at one of the one or more labeled places. In embodiments, the new data point is presented to the machine learning model and the machine learning model predicts a labeled place where the user is likely to be located at the time stamp of the new data point, together with a probability of the user being at the labeled place at the time stamp of the new data point.

In embodiments, the system determines, using the trained machine learning model, whether the first user will be, in a near future (e.g., within a preset period of time in the future), at one of the one or more labeled places. In embodiments, one or more new data points collected from the client device over a preset period of time are presented to the machine learning model and the machine learning model predicts a labeled place the user is likely to be located at a future time stamp, together with a probability of the user being at the labeled place at the future time stamp.

In embodiments, the system determines that the user is (or will be) located at the labeled place at a current or future time stamp, based on the probability of the user being at the labeled place at the current or future time stamp exceeding a preset threshold.

In block 814, based on determining that the user is located at one of the labeled place, the system (e.g., location sharing server application 114) initiates transmission of data to a second client device (e.g., client device 102) of the second user, the data comprising the labeled place where the first user is (or will be) located, for display, on a display screen of the second client device.

Based on determining that the user is currently located at one of the labeled place, the system cause display, on a display screen of the second client device, of a user interface (e.g., user interface 1100 of FIG. 11) including a map depicting an icon indicating the labeled place where the first user is located alongside the avatar of the first user.

Based on predicting that the user will be located at one of the labeled place, the system cause display, on a display screen of the second client device, of a user interface (e.g., user interface 1200 of FIG. 12) including a map depicting an icon indicating the labeled place where the user will be located alongside an indication of when the user is predicted to be at the labeled place.

Figure 9:
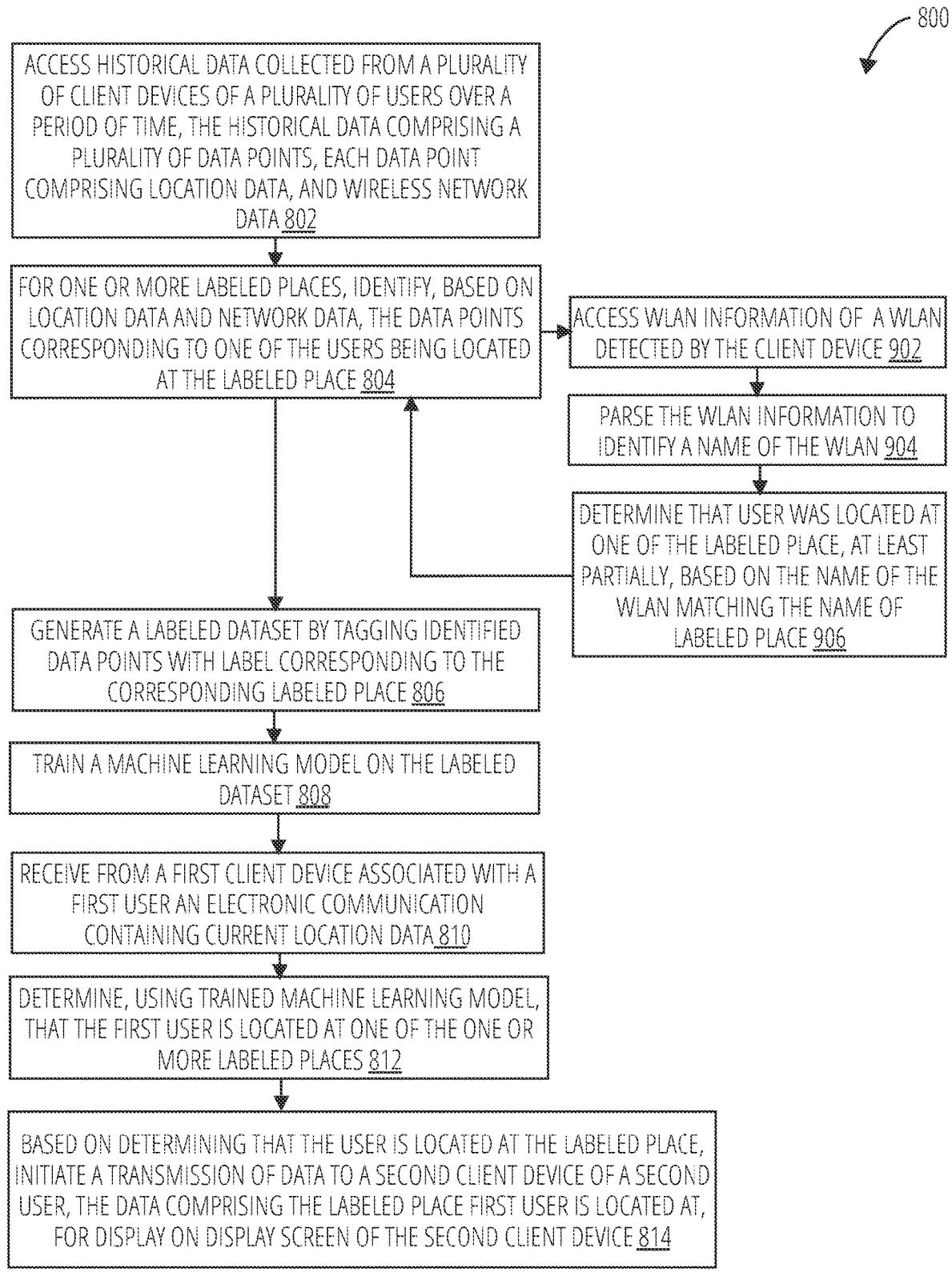
FIG. 9 illustrates a method in accordance with one embodiment.

As shown in FIG. 9, the method 800 may further include a block 902, a block 904, and a block 906, according to some embodiments. Consistent with some embodiments, block 902, block 904, and block 906, may be performed as part (e.g., as sub-blocks or as a subroutine) of block 804, where the data points corresponding to one or more of the users being located at the labeled place are identified. In these embodiments, one or more of the data points further include WLAN information of one or more WLAN networks detected by the client device at the time stamp of the data point.

In block 902, method 800 (e.g., the location component 408) accesses WLAN information of one or more WLAN networks detected by a client device (e.g., client device 102) at a particular data point.

The client devices may be equipped with wireless network detectors or network discovery software that facilitate detection of WLANs (e.g., using the 802.11b, 802.11a and 802.11g WLAN standards). Discovering networks may be done through active as well as passive scanning. Active scanning may be done through sending probe requests and recording a probe response sent by an AP, the probe response containing a WLAN SSID of the AP. Passive scanning may be done by mere listening to any data sent out by the AP. Once the client device connects to the AP, the AP sends out the WLAN SSID to the client device. The client device forwards WLAN information to the server computer (e.g., via the location sharing client application 104). The WLAN information contains a name (e.g., WLAN SSID) of the one or more WLAN networks detected by the client device. The SSID may be a natural language label. In embodiments, the client device only sends WLAN information of the WLAN the client device is connected to.

In block 904, method 800 parses the WLAN information received from the client device to identify the name (e.g., WLAN SSID) of the one or more WLANs detected by the client device.

In block 906, method 800 determines that the user was located at the labeled place at the particular data point, at least partially, based on the name of the local area network matching a name of the labeled place. Method 800 may further determine that one or more other users were located at the labeled place at the particular data point based on determining that the one or more other users were spending time with the user who is determined to have been at the labeled place. Method 800 may determine that the one or more other users are spending time with the user based on the one or more other users being connected to the user in a social graph (e.g., entity graph 304) and based on the location of the one or more other users being within a preset distance of the location of the user. Hence, it is possible to determine that a plurality of users was gathered at a labeled place based on only one of the users being connected to the WLAN of the labeled place.

Figure 10:
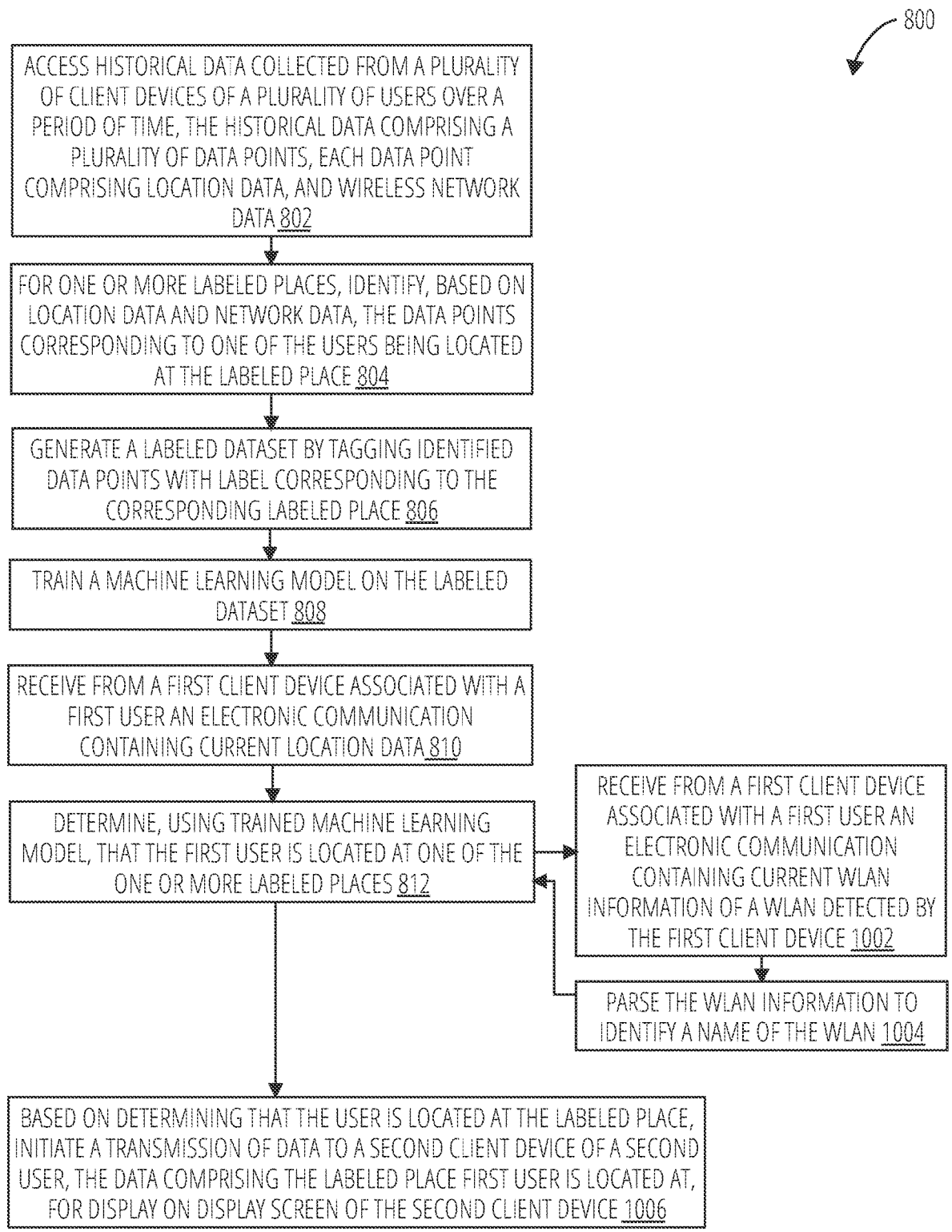
FIG. 10 illustrates a method in accordance with one embodiment.

As shown in FIG. 10, the method 800 may further include a block 1002, and a block 1004, according to some embodiments. Consistent with some embodiments, block 1002, and block 1004 may be performed as part (e.g., as sub-blocks or as a subroutine) of block 812 where a determination is made that the first user is located at one of the one or more labeled places.

In block 1002, method 800 receives, at the server computer (e.g., application server 112), from the first client device, an electronic communication containing current wireless network data. The current wireless network data may include parameters of one or more wireless local area network (WLAN) detected by the client device. In particular, the wireless network data may include a network name (e.g., SSID). The wireless network data may alternatively or additionally be received from an AP (e.g., wireless router) of the wireless network that transmit and receive radio frequencies from the first client device.

The first client device may be equipped with a network detector or network discovery software that facilitate detection of WLANs (e.g., using the 802.11b, 802.11a and 802.11g WLAN standards). As explained in relation to FIG. 9, discovering networks may be done through active as well as passive scanning. Once the first client has received the WLAN information, the client device forwards the WLAN information to the application server 112 (e.g., via the location sharing client application 104). In embodiments, the client device only sends WLAN information of the WLAN the client device is connected to.

In block 1004, method 800 (e.g., the location component 408) parses the WLAN information received from the client device to identify the name (e.g., WLAN SSID) of the one or more WLANs detected by the first client device.

In block 812, the system determines, using the trained machine learning model, that the first user is located at one of the one or more labeled places, at least partially, based on the name of the WLAN detected by the client device matching the name of the labeled place. The new data point is extracted from the current location data and current wireless network data. The new data point is defined by at least location data (e.g., a set of geographical coordinates), wireless network data (e.g., local area network name), and a time stamp. The new data point is presented to the machine learning model and the machine learning model predicts a likely labeled place for the new data point, together with a probability of the user being at the labeled place.

Figure 11:
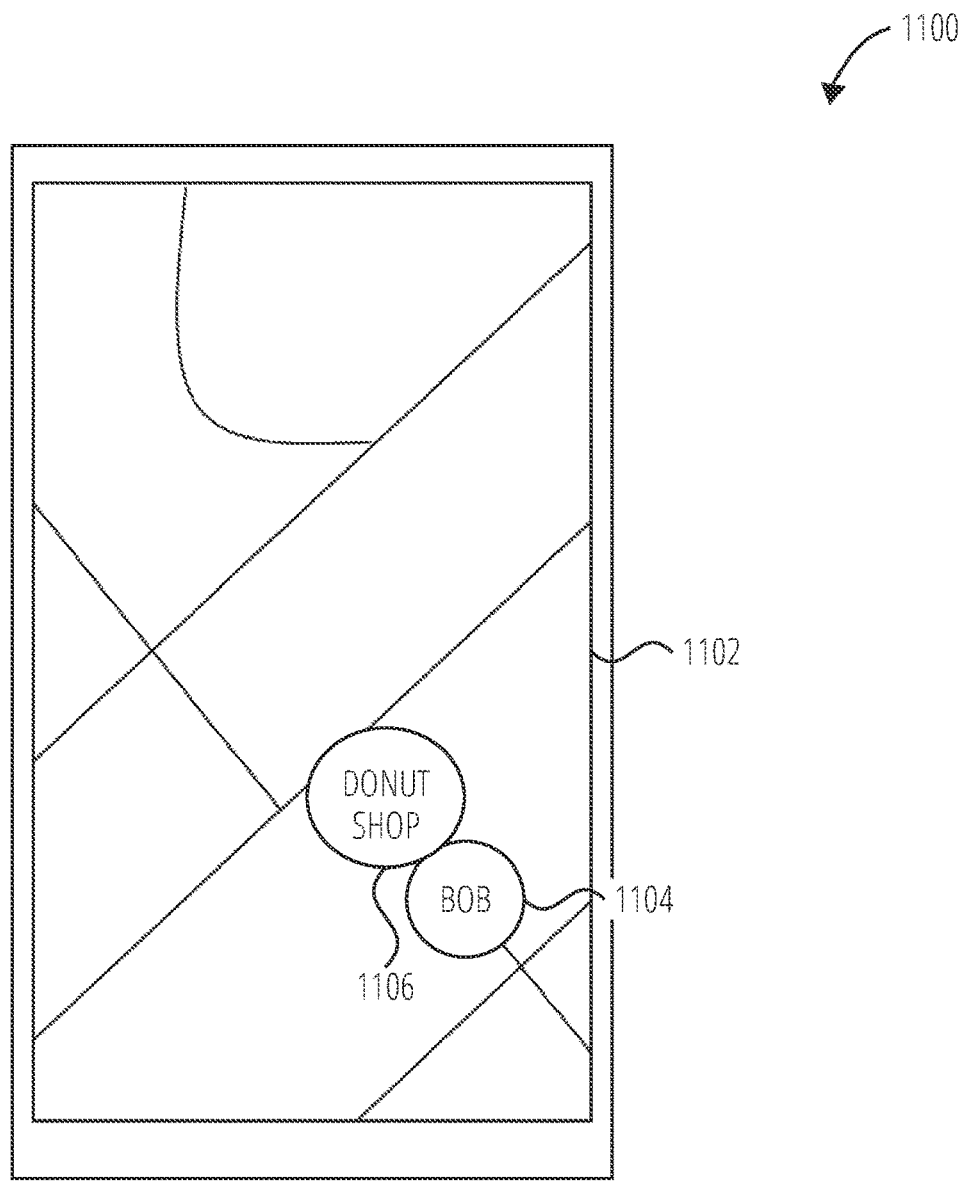
FIG. 11 illustrates a user interface in accordance with one embodiment.

As shown in FIG. 11, user interface 1100 is an example of a user interface that may be displayed on a display screen of a second user. User interface 1100 includes a map 1102 depicting an avatar 1104 of the first user. The avatar 1104 is a media content item associated with the first user and that may include a still image, animated image, video, or other content. The avatar may include a profile picture or a default icon. The location of the first user's avatar 1104 on the map GUI 1104 is representative of the current location of the first user. The system updates the location of the first user's avatar 1104 on the map 1102 as the location of the first user changes. The first user's avatar 1104 may be a selectable UI element triggering the display of a user interface (e.g., user interface 1300 of FIG. 13) including a map view centered on the selected avatar.

If the system determines that the first user is located at one of the labeled place (e.g., using method 800), the map 1102 displays the labeled place 1106 where the first user is located. The labeled place 1106 may be displayed as a text or an icon or a combination of both. An icon is a media content item that may include a still image, animated image, video, or other content.

Figure 12:
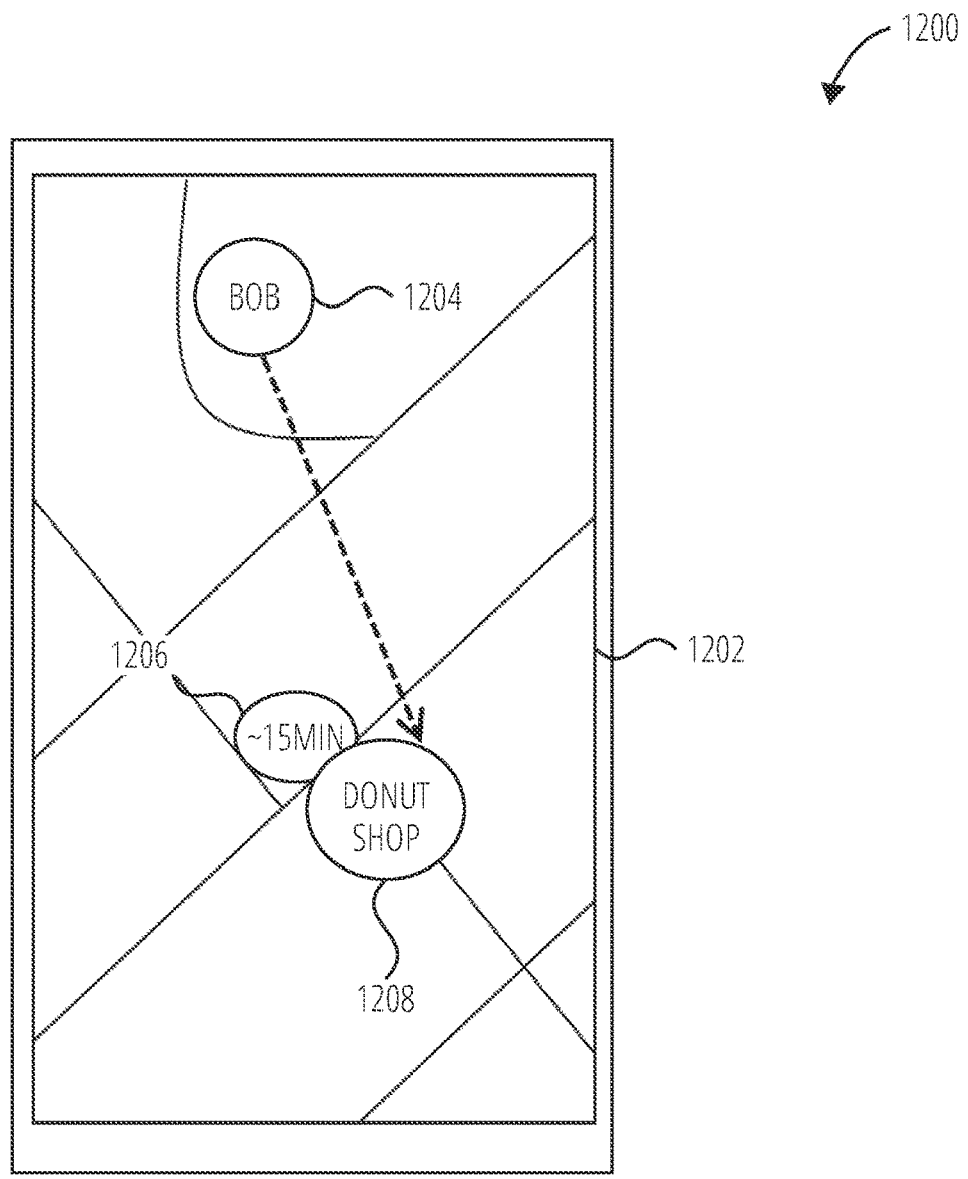
FIG. 12 illustrates a user interface in accordance with one embodiment.

As shown in FIG. 12, user interface 1200 is an example of a user interface that may be displayed on a display screen of a second user. User interface 1200 includes a map 1202 depicting an avatar 1204 of the first user. The first user's avatar 1204 may be a selectable UI element triggering the display of a user interface (e.g., user interface 1300 of FIG. 13) including a map view centered on the selected avatar.

If the system predicts that the first user will be located at one of the labeled place (e.g., using method 800) in a near future, the map 1202 displays the labeled place 1208 where the first user will be located, with an estimation of when the user is predicted to arrive at the labeled place.

Figure 13:
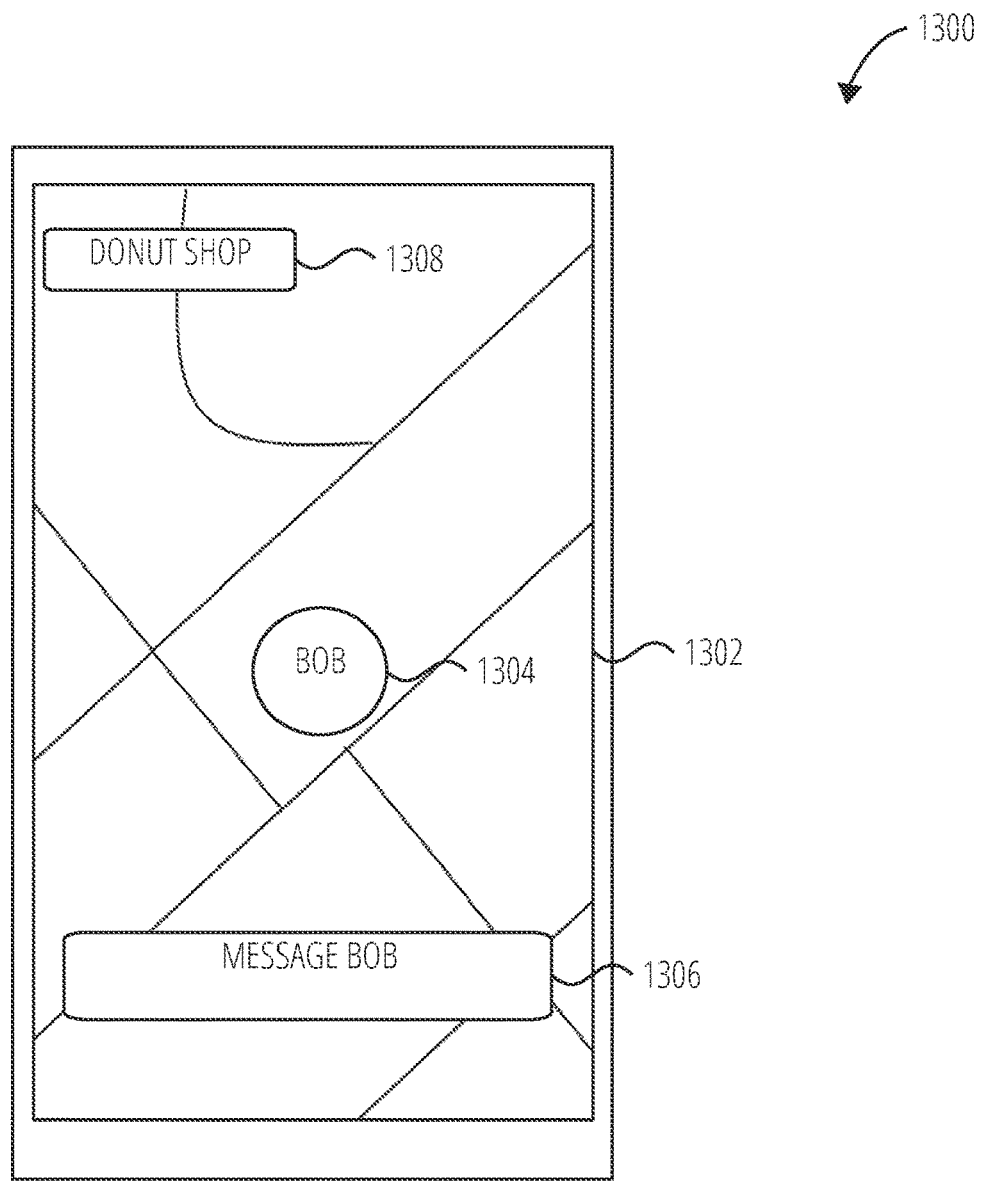
FIG. 13 illustrates a user interface in accordance with one embodiment.

As shown in FIG. 13, user interface 1300 includes a map 1302 centered around the first user's avatar 1304. The user interface 1300 may also include the labeled place 1106 where the first user is presumed to be located. The user interface 1300 may also include a selectable user interface element 1306 for initiating or resuming a communication session with the first user via the messaging system 116.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Client Device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Ephemeral Message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

What is claimed is:

1. A method comprising:
   training a machine learning model with a labeled dataset, the labeled dataset comprising first data points indicating at least one user being previously located at a labeled place;
   receiving, from a first client device associated with a first user, an electronic communication containing current location data;
   determining, using the trained machine learning model, that the first user is located at the labeled place; and
   initiating, based on determining that the first user is located at the labeled place, transmission of data to a second client device by attaching the data to a message accessible for a predetermined duration of time, the data indicating the labeled place at which the first user is located for display on a display screen of the second client device.

2. The method of claim 1, further comprising, prior to training the machine learning model:
   accessing historical data collected from at least one client device of the at least one user over a period of time, the historical data comprising a plurality of second data points, each data point in the plurality of second data points comprising location data, and wireless network data;

identifying, based on the location data and the wireless network data, the first data points of the plurality of second data points corresponding to the at least one user being located at the labeled place; and generating the labeled dataset by tagging the first data points with a label corresponding to the labeled place.

3. The method of claim 2, wherein the wireless network data comprises wireless local area network (WLAN) information of one or more WLAN networks available to the at least one client device.

4. The method of claim 3, wherein identifying the first data points comprises:

parsing the WLAN information to identify a name of the one or more WLAN networks; and determining that the at least one user was located at the labeled place, at least partially, based on the name of one of the WLAN networks matching a name of the labeled place.

5. The method of claim 2, wherein the wireless network data comprises WLAN information of a WLAN the at least one client device is connected to.

6. The method of claim 2, wherein the historical data further comprises venue metadata of the labeled place.

7. The method of claim 2, wherein the historical data further comprises checking in data of one or more of the at least one user at the labeled place.

8. The method of claim 1, wherein determining that the first user is located at the labeled place further comprises:

computing, using the trained machine learning model, a probability of the first user being located at the labeled place; and determining that the first user is located at the labeled place based on the probability exceeding a preset threshold.

9. The method of claim 1, wherein the machine learning model is trained using a gradient boosting.

10. A system, comprising:

one or more processors; and a memory storing instructions that, when executed by the one or more processors, cause the one or more processors to perform operations comprising:

training a machine learning model with a labeled dataset, the labeled dataset comprising first data points indicating at least one user being previously located at a labeled place;

receiving, from a first client device associated with a first user, an electronic communication containing current location data;

determining, using the trained machine learning model, that the first user is located at the labeled place; and initiating, based on determining that the first user is located at the labeled place, transmission of data to a second client device by attaching the data to a message accessible for a predetermined duration of time, the data indicating the labeled place at which the first user is located for display on a display screen of the second client device.

11. The system of claim 10, the operations further comprising, prior to training the machine learning model:

accessing historical data collected from at least one client device of the at least one user over a period of time, the historical data comprising a plurality of second data points, each data point in the plurality of second data points comprising location data, and wireless network data;

identifying, based on the location data and the wireless network data, the first data points of the plurality of second data points corresponding to the at least one user being located at the labeled place; and generating the labeled dataset by tagging the first data points with a label corresponding to the labeled place.

12. The system of claim 11, wherein the wireless network data comprises wireless local area network (WLAN) information of one or more WLAN networks available to the at least one client device.

13. The system of claim 12, wherein identifying the first data points comprises:

parsing the WLAN information to identify a name of the one or more WLAN networks; and determining that the at least one user was located at the labeled place, at least partially, based on the name of one of the WLAN networks matching a name of the labeled place.

14. The system of claim 11, wherein the wireless network data comprises WLAN information of a WLAN the at least one client device is connected to.

15. The system of claim 11, wherein the historical data further comprises venue metadata of the labeled place.

16. The system of claim 11, wherein the historical data further comprises checking in data of one or more of the at least one user at the labeled place.

17. The system of claim 10, wherein determining that the first user is located at the labeled place further comprises:

computing, using the trained machine learning model, a probability of the first user being located at the labeled place; and determining that the first user is located at the labeled place based on the probability exceeding a preset threshold.

18. The system of claim 10, wherein the machine learning model is trained using a gradient boosting.

19. A non-transitory computer-readable medium comprising instructions, which when executed by a computing device, cause the computing device to perform operations comprising:

training a machine learning model with a labeled dataset, the labeled dataset comprising first data points indicating at least one user being previously located at a labeled place;

receiving, from a first client device associated with a first user, an electronic communication containing current location data;

determining, using the trained machine learning model, that the first user is located at the labeled place; and initiating, based on determining that the first user is located at the labeled place, transmission of data to a second client device by attaching the data to a message accessible for a predetermined duration of time, the data indicating the labeled place at which the first user is located for display on a display screen of the second client device.

20. The non-transitory computer-readable medium of claim 19, the operations further comprising, prior to training the machine learning model:

accessing historical data collected from at least one client device of the at least one user over a period of time, the historical data comprising a plurality of second data points, each data point in the plurality of second data points comprising location data, and wireless network data;

identifying, based on the location data and the wireless network data, the first data points of the plurality of second data points corresponding to the at least one user being located at the labeled place; and generating the labeled dataset by tagging the first data points with a label corresponding to the labeled place.

\* \* \* \* \*